United States Patent
Gallegos et al.

(10) Patent No.: US 12,163,546 B2
(45) Date of Patent: Dec. 10, 2024

(54) SEALING FASTENERS (71) Applicant: Unirac Inc., Albuquerque, NM (US)

(72) Inventors: Ernest Gallegos, Albuquerque, NM (US); Todd Ganshaw, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 236 days.

(21) Appl. No.: 17/592,453

(22) Filed: Feb. 3, 2022

(65) Prior Publication Data
US 2022/0243754 A1    Aug. 4, 2022

Related U.S. Application Data (60) Provisional application No. 63/145,334, filed on Feb. 3, 2021.

(51) Int. Cl.
*F16B 33/00* (2006.01)

(52) U.S. Cl.
CPC ............ *F16B 33/004* (2013.01); *F16B 33/00* (2013.01)

(58) Field of Classification Search
CPC .... F16B 11/006; F16B 13/141; F16B 13/144; F16B 33/004; F16B 41/005; F16B 43/00; F16B 43/001; F16B 33/00; Y10S 411/91; Y10S 411/915
USPC ............ 411/82, 82.3, 371.1, 372.5, 373, 542
See application file for complete search history.

(56) References Cited

U.S. PATENT DOCUMENTS

| | | | | |
|---|---|---|---|---|
| 3,469,490 A | * | 9/1969 | Pearce, Jr. ............ | F16B 43/001 411/965 |
| RE27,085 E | * | 3/1971 | Weidner, Jr. ........... | F16J 15/121 411/371.1 |
| 3,606,357 A | * | 9/1971 | Yonkers ................ | F16B 43/001 277/637 |
| 3,670,618 A | * | 6/1972 | Jellison ................. | F16B 43/001 277/637 |
| 4,749,321 A | * | 6/1988 | Knohl ..................... | F16B 37/14 411/372.5 |
| 6,035,595 A | * | 3/2000 | Anderson ............ | E04F 13/045 52/363 |
| 8,931,989 B2 | * | 1/2015 | Stephan ................... | F16J 15/14 411/371.1 |
| 2010/0047033 A1 | * | 2/2010 | Baumgartner ........ | F16B 35/048 411/84 |
| 2011/0152133 A1 | | 6/2011 | Sanders et al. | |
| 2016/0134230 A1 | | 5/2016 | Meine et al. | |
| 2016/0248369 A1 | | 8/2016 | Almy | |
| 2017/0279403 A1 | | 9/2017 | Seery et al. | |
| 2018/0062560 A1 | | 3/2018 | Stephan et al. | |
| 2018/0152133 A1 | | 5/2018 | Schaefer et al. | |
| 2019/0131917 A1 | | 5/2019 | Tomolillo | |
| 2020/0309184 A1 | | 10/2020 | Schuit et al. | |

(Continued)

OTHER PUBLICATIONS

The International Search Report and Written Opinion for PCT Application No. PCT/US22/15136, mailed Apr. 26, 2022.

(Continued)

*Primary Examiner* — Roberta S Delisle
(74) *Attorney, Agent, or Firm* — Lee & Hayes, P.C.

(57) ABSTRACT

A fastening device includes a fastener and a sealant. The sealant may be disposed about the fastener. Engagement of the fastener with a substrate forces the sealant into at least a borehole defined within the substrate as the fastener engages with the substrate.

20 Claims, 12 Drawing Sheets (56) References Cited

U.S. PATENT DOCUMENTS

2020/0378110 A1    12/2020  Meine
2022/0010832 A1*    1/2022  Freis .................... F16B 43/001

OTHER PUBLICATIONS

The International Preliminary Report on Patentability mailed Aug. 17, 2023 for PCT Application No. PCT/US22/13995, 9 pages.

* cited by examiner

SEALING FASTENERS

RELATED APPLICATION

This application claims the benefit of priority provisional U.S. Application No. 63/145,334, filed Feb. 3, 2021, which is incorporated herein by reference in its entirety.

TECHNICAL FIELD

The present disclosure relates generally to coupling devices. Specifically, the present disclosure relates to systems and methods for surface coupling devices incorporating a sealing means to seal any apertures defined in the surface of a substrate created by fasteners used to fasten the coupling devices to the substrate.

BACKGROUND

In many applications, a bracket or other coupling device may be secured to a structure such as, for example, a roof of a residence or commercial building. The brackets may be used to secure devices that are to, in turn, be secured to the structure such as, for example, photovoltaic panels. However, the fasteners used to couple the brackets to the structure also create a hole in the structure. Without flashing or other measures, the hole created by the fastener may cause fluids such as precipitation that may fall on the exterior of the structure to seep into the interior of the structure.

In turn, allowing for fluids such as precipitation to enter the structure may cause significant damage to the structure. Further, allowing for fluids such as precipitation to enter the structure may create a health hazard for individuals since, for example, mold may form within the structure or weight bearing elements of the structure may be compromised due to the introduction of precipitation to the structure via the hole created by the fastener.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

In the examples described herein, a sealant is associated with a fastener and a coupling device. In one example, the sealant may be contained within a reservoir of sealant enclosed by one or more elements to create a sealant packet. The engagement of the fastener with the coupling device, the structure, and/or flashing may cause the sealant within the sealant packet to surround the fastener and fill any holes in the flashing and/or structure resulting in a water-tight fixture. Thus, a coupling system may include a fastener, and a sealant packet associated with the fastener including a sealant. The coupling system may also include a coupling device. The fastener couples the coupling device to a structure via at least one aperture defined through the coupling device. The coupling device may include at least one recess defined in a structure side of the coupling device and fluidically coupled to the aperture. The engagement of the fastener with the coupling device causes the sealant within the sealant packet to flow into the at least one aperture and the recess.

The engagement of the fastener with the coupling device causes the sealant within the sealant packet to flow into a borehole defined within the structure as the fastener engages with the structure. The coupling system may further include a flashing or flashing layer. The fastener engages with the structure via the flashing. The engagement of the fastener with the coupling device causes the sealant within the sealant packet to flow into a second borehole defined within the flashing as the fastener engages with the flashing. The sealant packet includes a deformable substrate enclosing the sealant packet, wherein deformation of the deformable substrate causes the sealant within the sealant packet to flow out of the sealant packet.

In this manner, a water-tight seal is created around the fastener resulting in the inability of water entering underneath the coupling device, within the coupling device, around the fastener and/or within the structure.

Examples described herein provide a coupling system for attaching an object to a substrate. The coupling system may include a fastening device. The fastening device may include a fastener and a sealant. The sealant may be disposed about the fastener. The coupling system may further include a reservoir in which the sealant is contained. Further, the coupling system may include a coupling device. The coupling device may include at least one aperture defined in the coupling device and at least one recess defined in a first side of the coupling device and located opposite a second side of the coupling device including the reservoir. The at least one recess may be in fluid communication with the reservoir and the at least one aperture. Engagement of the fastener with the substrate via the coupling device may force the sealant from the reservoir, through the at least one aperture, and into the recess.

The engagement of the fastener with the coupling device further forces the sealant into a borehole defined within the substrate by the fastener as the fastener engages with the substrate. The coupling system may further include a flashing. The fastener engages with the substrate via the flashing. The engagement of the fastener with the coupling device further forces the sealant into a borehole defined within the flashing as the fastener engages with the flashing.

The coupling system may further include a deformable substrate enclosing the sealant. The deformable substrate may form at least a portion of the reservoir. Deformation of the deformable substrate by the fastener engaging with the substrate may force the sealant from the reservoir, through the at least one aperture, and into the recess.

The coupling system may further include a plunger coupled to the fastener and at least one buttress wall. The at least one buttress wall opposes the plunger. The buttress wall and the plunger may form at least a portion of the reservoir. The plunger forces the sealant into the at least one aperture and the recess when the fastener is engaged with the substrate. The at least one buttress wall may be formed on the coupling device. The plunger may be a permanent device or disposable.

The coupling device may include a plurality of apertures defined therethrough. The engagement of the fastener with the substrate via the coupling device forces the sealant from the reservoir, through the plurality of apertures, and into the recess. The coupling device couples the object to the substrate by the object coupling to the coupling device. The coupling system may further include a cap removably disposed over the fastener.

Examples described herein also provide a fastening device. The fastening device may include a fastener, and a sealant. The sealant may be disposed about the fastener. Engagement of the fastener with a substrate forces the sealant into at least a borehole defined within the substrate as the fastener engages with the substrate.

The fastening device may further include a flashing. The fastener engages with the substrate via the flashing. The engagement of the fastener with the coupling device further forces the sealant into a borehole defined within the flashing as the fastener engages with the flashing.

The fastening device may further include a deformable substrate enclosing the sealant. The deformation of the deformable substrate by the fastener engaging with the substrate forces the sealant from the deformable substrate and into the borehole defined within the substrate as the fastener engages with the substrate.

The fastening device may further include a plunger coupled to the fastener, and at least one buttress wall. The at least one buttress wall opposes the plunger. Further, the buttress wall and the plunger form at least a portion of a reservoir. The reservoir contains the sealant. The plunger forces the sealant into the borehole defined within the substrate as the fastener engages with the substrate. The fastening device may further include a cap removably disposed over the fastener.

Examples described herein also provide a coupling device including a reservoir in which a sealant is contained. The reservoir may include at least one buttress wall, at least one aperture defined in the coupling device, and at least one recess defined in a first side of the coupling device and located opposite a second side of the coupling device including the reservoir. The at least one recess may be in fluid communication with the reservoir and the at least one aperture. Engagement of a fastener with a substrate via the coupling device forces the sealant from the reservoir with the at least one buttress wall exhibiting force on the sealant, through the at least one aperture, and into the recess.

The coupling device may include a plurality of apertures defined therethrough. The engagement of the fastener with the substrate via the coupling device forces the sealant from the reservoir, through the plurality of apertures, and into the recess. The coupling device couples an object to the substrate. The coupling device may further include flashing located juxtaposition to the recess.

Additionally, the techniques described in this disclosure may be performed as a method and/or by a system having non-transitory computer-readable media storing computer-executable instructions that, when executed by one or more processors, performs the techniques described above.

Example Embodiments

Figure 1:
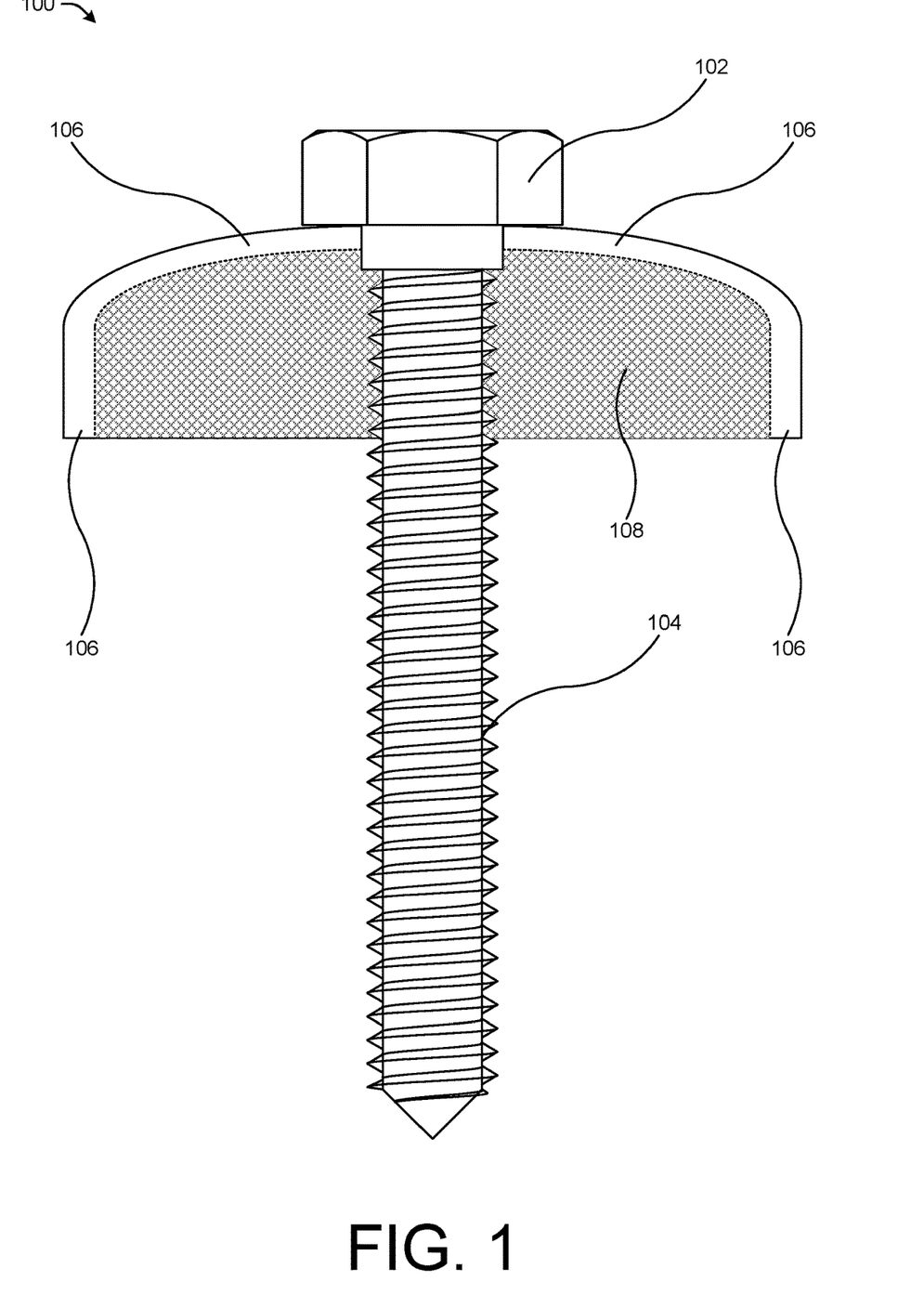
FIG. 1 illustrates a partial cross-sectional side view of a fastener including an incorporated sealant within a deformable umbrella cap, according to an example of the principles described herein.
Figure 2:
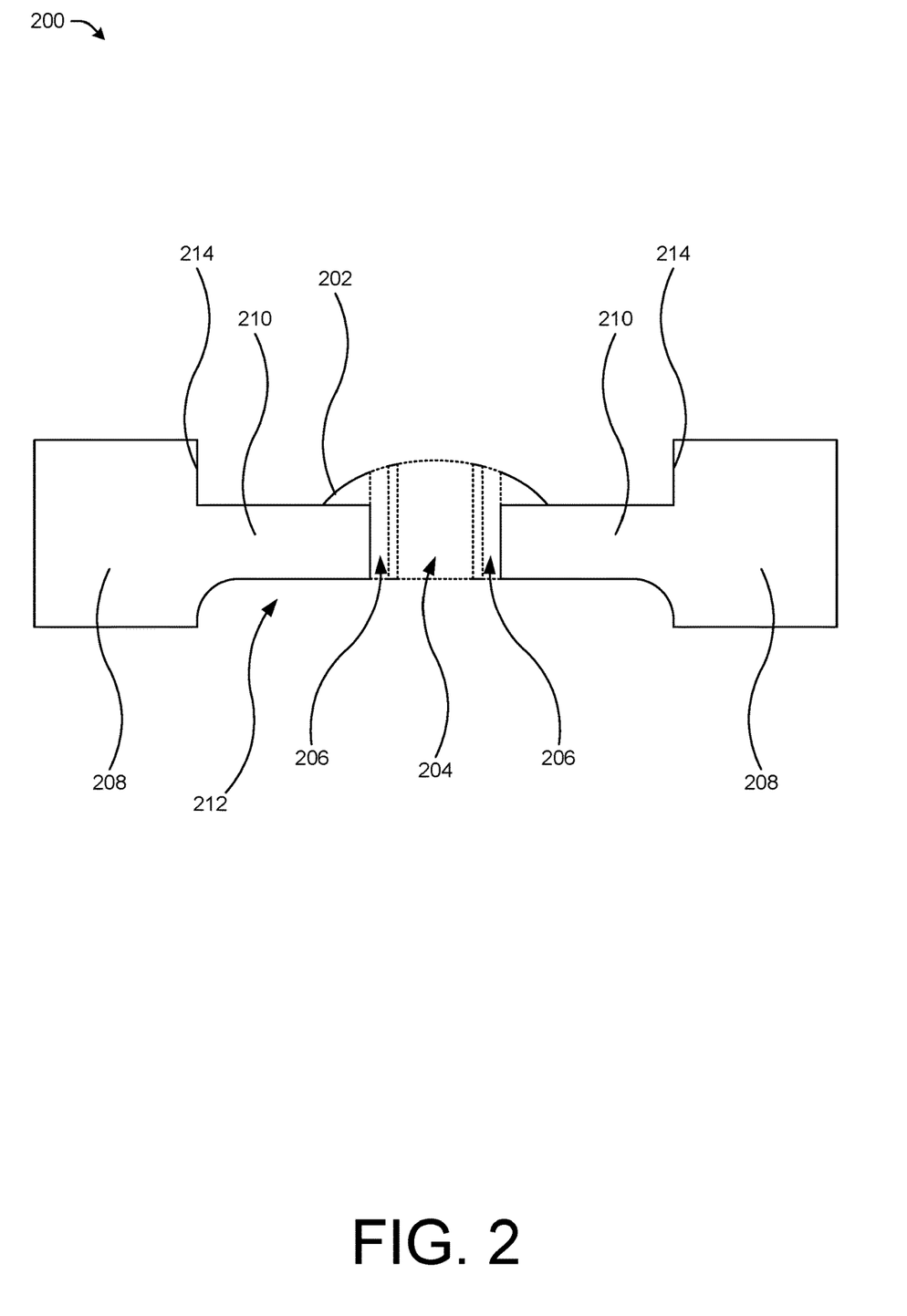
FIG. 2 illustrates a partial cross-sectional side view of a coupling device to which the fastener of FIG. 1 may be coupled, according to an example of the principles described herein.
Figure 3:
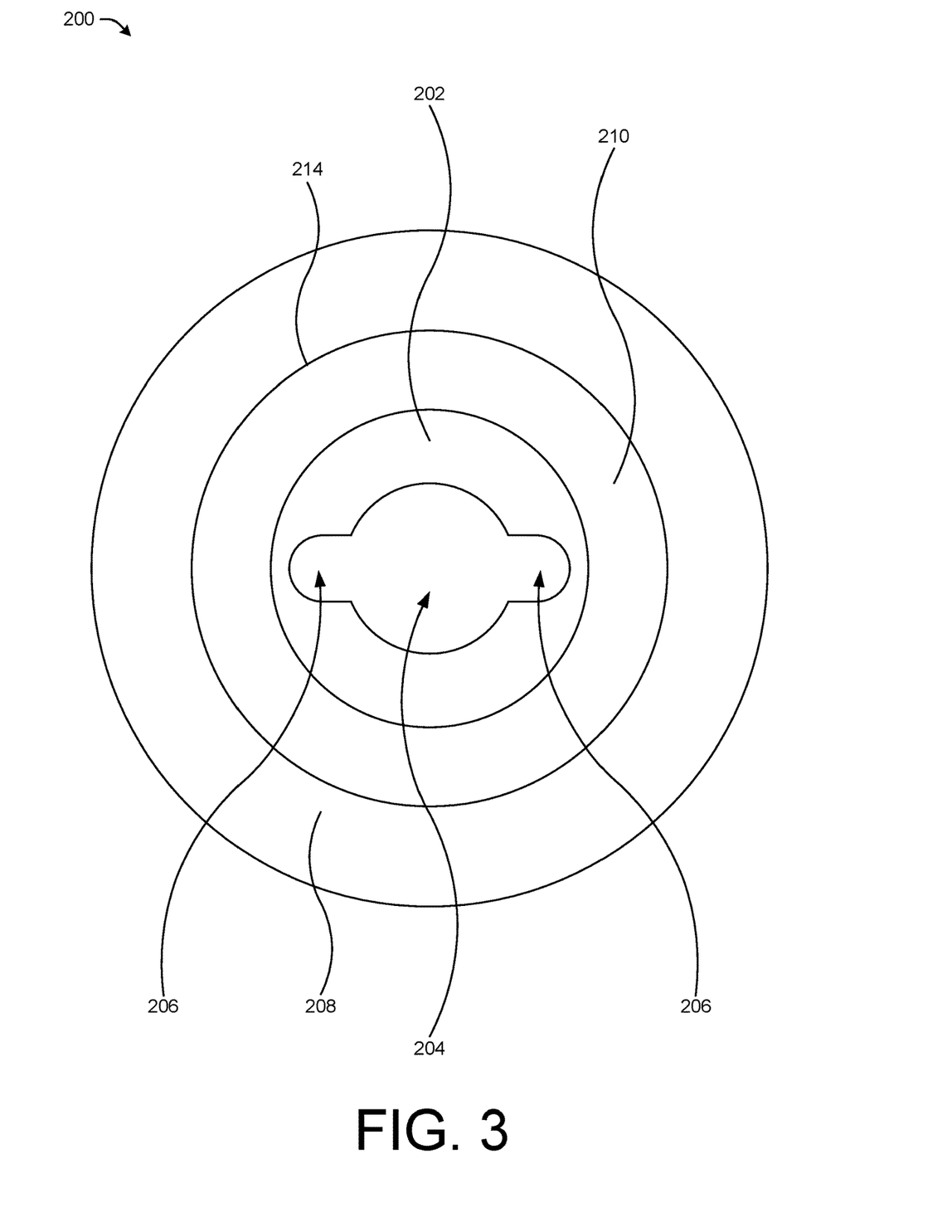
FIG. 3 illustrates a top view of the coupling device of FIG. 2, according to an example of the principles described herein.
Figure 4:
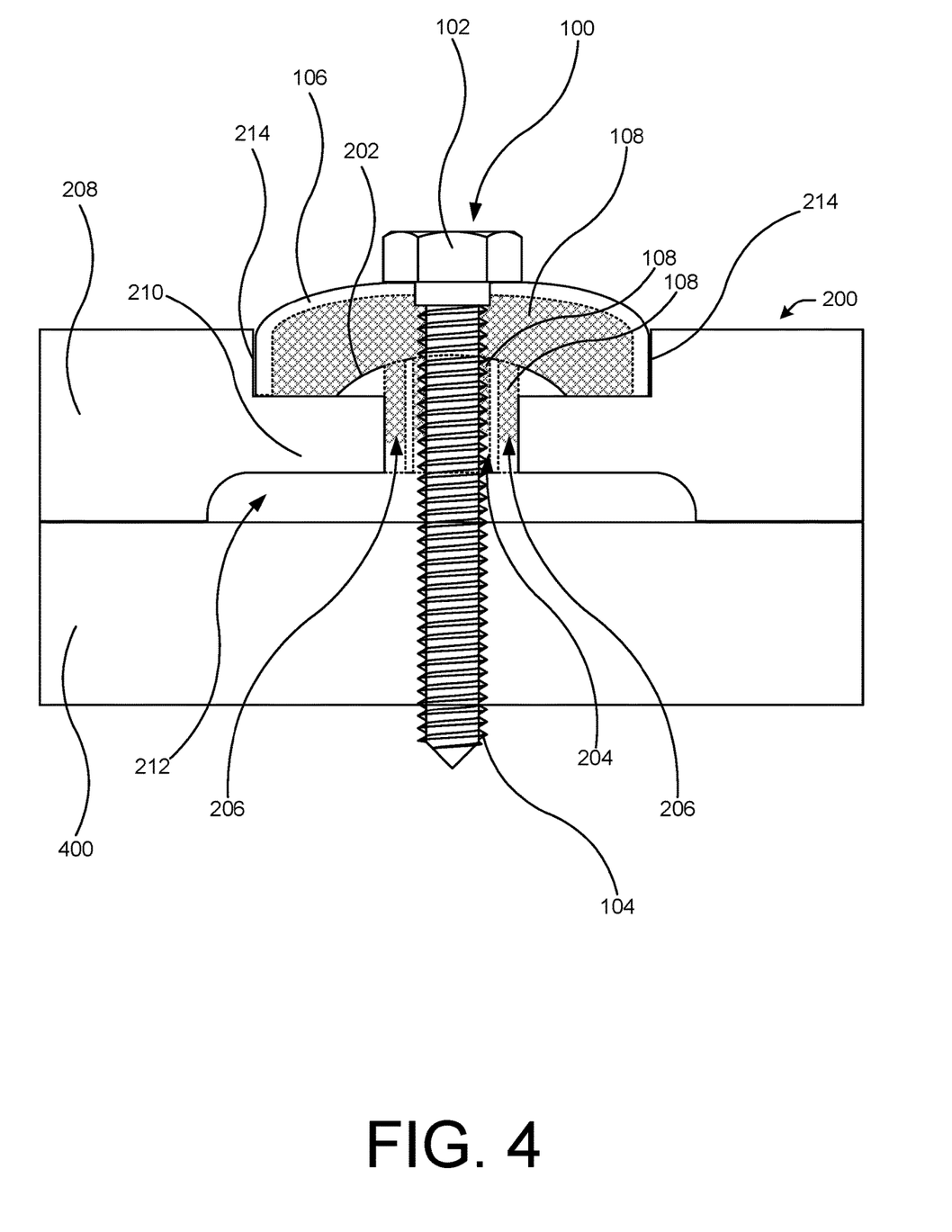
FIG. 4 illustrates a partial cross-sectional side view of the fastener of FIG. 1 engaged with the coupling device of FIG. 2 at a first state, according to an example of the principles described herein.
Figure 5:
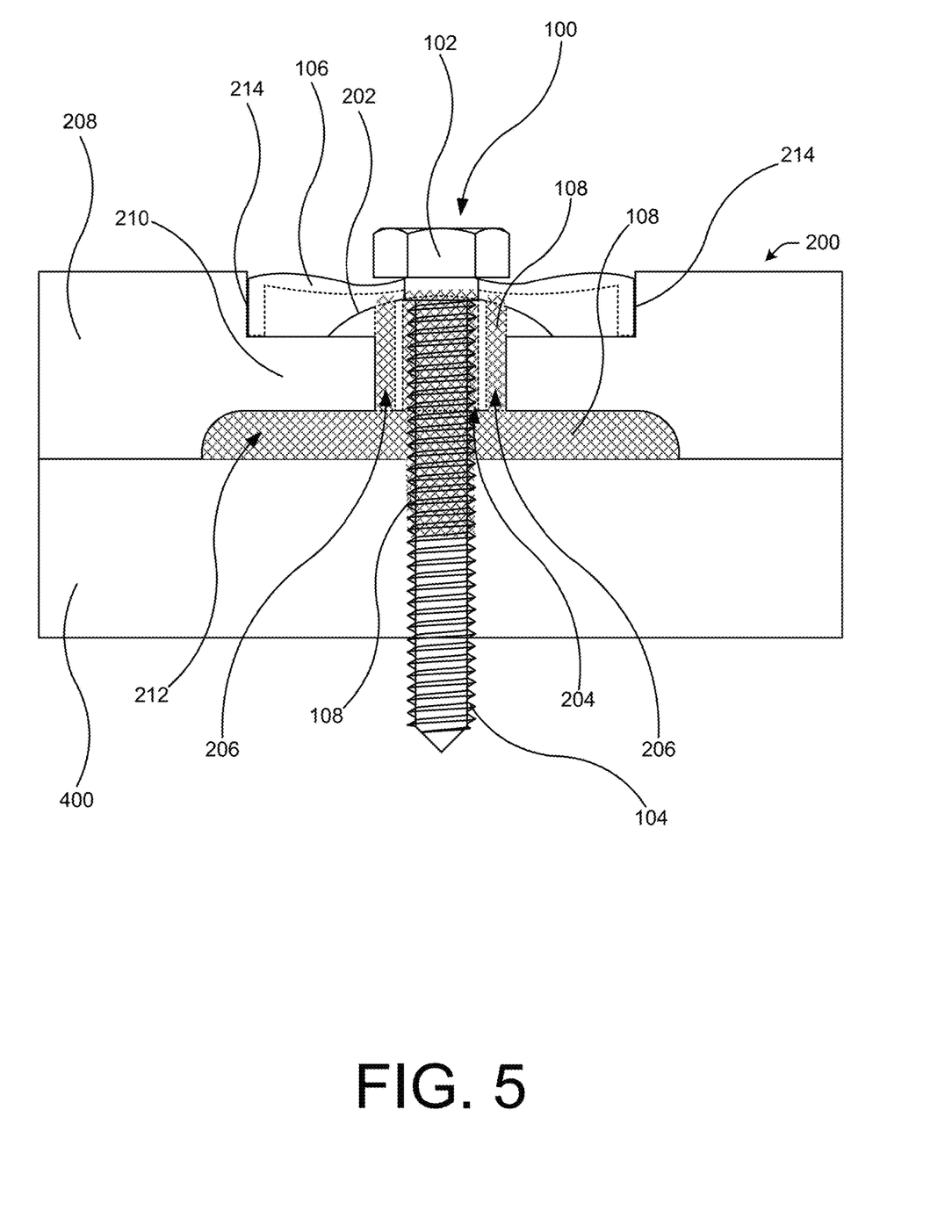
FIG. 5 illustrates a partial cross-sectional side view of the fastener of FIG. 1 engaged with the coupling device of FIG. 2 at a second state, according to an example of the principles described herein.

Turning now to the figures, FIGS. 1 through 6 depict an example of a coupling system, according to an example of the principles described herein. More specifically, FIG. 1 illustrates a partial cross-sectional side view of a fastener 100 including an incorporated sealant 108 within a deformable umbrella cap 106, according to an example of the principles described herein. FIG. 2 illustrates a partial cross-sectional side view of a coupling device 200 to which the fastener 100 of FIG. 1 may be coupled, according to an example of the principles described herein. FIG. 3 illustrates a top view of the coupling device 200 of FIG. 2, according to an example of the principles described herein. FIG. 4 illustrates a partial cross-sectional side view of the fastener 100 of FIG. 1 engaged with the coupling device 200 of FIG. 2 at a first state, according to an example of the principles described herein. FIG. 5 illustrates a partial cross-sectional side view of the fastener 100 of FIG. 1 engaged with the coupling device 200 of FIG. 2 at a second state, according to an example of the principles described herein. The fastener 100 of FIG. 1 and the coupling device 200 of FIG. 2 form a coupling system that serves to couple an object such a number of rails, photovoltaic panel assemblies and other devices to a substrate such as a roof of a structure. Because engaging a fastener to a roof of a structure as the substrate creates a borehole, precipitation may enter the borehole and damage the roof and/or portions of the structure. Therefore, the Turning to FIG. 1, the fastener 100 may include a head 102 and a threaded shaft 104. The head 102 and the threaded shaft 104 may form a bolt such as, for example, a lag bolt for coupling objects to a substrate. The fastener may also include an umbrella cap 106. The umbrella cap 106 may be formed with or coupled to the head 102 and may include an interior portion. An amount of sealant 108 may be contained within the interior portion of the umbrella cap 106. In this manner, the interior portion of the umbrella cap 106 may serve as a reservoir in which the sealant 108 may be contained or housed. The umbrella cap 106 and the sealant 108 may be referred to collectively as a sealant package. In one example, the sealant 108 may be retained within the umbrella cap 106 through the adhesive and/or viscosity properties of the sealant 108. In one example, the sealant 108 may be retained within the umbrella cap 106 as the umbrella cap 106 abuts a substrate of the coupling device 200 as described herein.

The fastener 100 may be coupled to the coupling device 200 of FIGS. 2 and 3. The coupling device 200 may include a domed portion 202 located at the center of a body 208. A bridge 210 may couple the domed portion 202 to the body 208. In one example, the coupling device may be circular as illustrated in FIG. 3 but may take any shape including a rectangle. In one example, the coupling device 200 may include a rail that include a number of coupling devices along the length of the rail to couple the rail to the substrate along a length of the substrate.

The coupling device 200 may include a number of apertures defined in the domed portion 202 including a fastener aperture 204 defined in a center of the domed portion 202 and a number of secondary apertures 206 defined in the domed portion 202 juxtaposition to the fastener aperture 204.

The coupling device 200 may further include a recess 212 defined in a bottom side opposite the side on which the domed portion 202 is located. The recess 212 is fluidically coupled to the fastener aperture 204 and the secondary apertures 206.

FIGS. 4 and 5 illustrate the fastener 100 coupled to the coupling device 200. Further, a portion of the threaded shaft 104 of the fastener 100 is engaged or embedded within the substrate 400 of a structure. The substrate 400 of the structure may include, for example, any number of architectural elements such as shingles, waterproofing layers, and decking, among others.

In one example, the umbrella cap 106 may couple to the coupling device 200 via an engineering fit between the umbrella cap 106 and a number of buttress walls 214 formed by the transition between the bridge 210 and the body 208. Thus, the umbrella cap 106 may engage with the buttress walls 214 such that their respective dimensions create an engineering fit therebetween. As used in the present specification and in the appended claims, the term "engineering fit" is meant to be understood broadly as any engineering fit such as, for example, a clearance fit (e.g., one of a loose running fit, a free running fit, a close running fit, a sliding fit, and a location fit), a transition fit (e.g., one of a similar fit, and a fixed fit), and an interference fit (e.g., one of a press fit, a driving fit, and a forced fit). In this manner, the fastener 100 may be coupled to the coupling device 200 via an engineering fit.

The umbrella cap 106 may be made of a flexible and/or deformable material such as a plastic material, a rubber material, a metal, and a metal alloy, among others. For example, the umbrella cap 106 may be made of an aluminum. As depicted in the difference between FIG. 4 and FIG. 5, engagement of the fastener 100 with the substrate 400 via the coupling device 200 forces the sealant 108 within the interior portion of the umbrella cap 106 out of the umbrella cap 106 and through at least one of the fastener aperture 204 and the secondary apertures 206, and into the recess 212. Because the bottom of the coupling device 200 abuts the top of the substrate 400, the recess 212 is enclosed by the substrate 400. Therefore, when the sealant 108 is expressed through the fastener aperture 204 and/or the secondary apertures 206, the sealant may fill the recess 212.

In one example, the sealant 108 may be forced down the fastener aperture 204, around the threaded shaft 104 of the fastener 100, and into the recess 212 as the threaded shaft 104 moves through the fastener aperture 204. Further, the sealant 108 may be forced down the secondary apertures 206 in order to fill the recess 212 with the sealant 108 in a uniform manner.

Still further, as depicted in FIG. 5, the sealant 108 may be forced into a borehole created in the substrate 400 by the fastener 100 as the fastener 100 further engages with the substrate 400 (e.g., as the fastener 100 is driven further into the substrate 400). In this manner, the sealant 108 is able to penetrate into the substrate 400 and seal the interior of the structure of which the substrate 400 is a part of from environmental elements such as precipitation and thermal conductivity.

As the fastener 100 is driven through the fastener aperture 204 and further into the substrate 400, the head 102 of the fastener 100 may push down on the top of the umbrella cap 106 causing the umbrella cap 106 to deform and collapse toward the coupling device 200. The deformation and collapse of the umbrella cap 106 causes the sealant 108 contained therein to be forced into the fastener aperture 204 and/or the secondary apertures 206, and into the recess 212 resulting in a sealed fastener 100 and substrate 400. Although some sealant 108 may remain within the umbrella cap 106, the volume of sealant 108 within the umbrella cap 106 and/or the size of the umbrella cap 106 may be sufficiently large enough to ensure that the entirety of the recess 212 is filled with sealant 108. In one example, the fastener 100 may further include a washer or similar element between the head 102 and the umbrella cap 106 in order to assist in creating a force on the full breadth of the umbrella cap 106 in order to more effectively force the sealant 108 from the umbrella cap 106 as the fastener 100 is driven into the substrate 400.

The buttress walls 214 may also serve to ensure that the umbrella cap 106 does not move in a lateral direction an allow the sealant 108 to escape the umbrella cap 106 before being forced into the fastener aperture 204 and/or the secondary apertures 206. In one example, the edges of the umbrella cap 106 may be coupled to the buttress walls 214 through gluing, welding, the use of fasteners, or through other means so that the umbrella cap 106 does not move from its seated position within the buttress walls 214. In this example, the head 102 and the threaded shaft 104 (e.g., the bolt portion) of the fastener 100 may move independently of the umbrella cap 106. In one example, the umbrella cap 106 may be separate from the head 102 and the threaded shaft 104 (e.g., the bolt portion) of the fastener 100 and coupled to the buttress wall 214 of the coupling device 200 as described above. This combination of the umbrella cap 106 and the coupling device 200 may be sold and/or packaged as a kit or system apart from the head 102 and the threaded shaft 104 (e.g., the bolt portion), and a user may procure the head 102 and the threaded shaft 104 (e.g., the bolt portion) in order to couple the combination of the umbrella cap 106 and the coupling device 200 to the substrate 400.

Further, in one example, the fastener 100 and the coupling device 200 may be sold and/or packaged as separate elements or together as a kit or system. In one example, the fastener 100 and the coupling device 200 may be sold and/or packaged in a coupled manner where the umbrella cap 106 is secured to the coupling device 200 via an engineering fit as described above and with the head 102 and the threaded shaft 104 (e.g., the bolt portion) coupled to the umbrella cap 106. In one example, the umbrella cap 106, the head 102 and the threaded shaft 104 (e.g., the bolt portion), and/or the coupling device 200 may all be sold and/or packaged separately or as a kit or system in any combination thereof.

Figure 6:
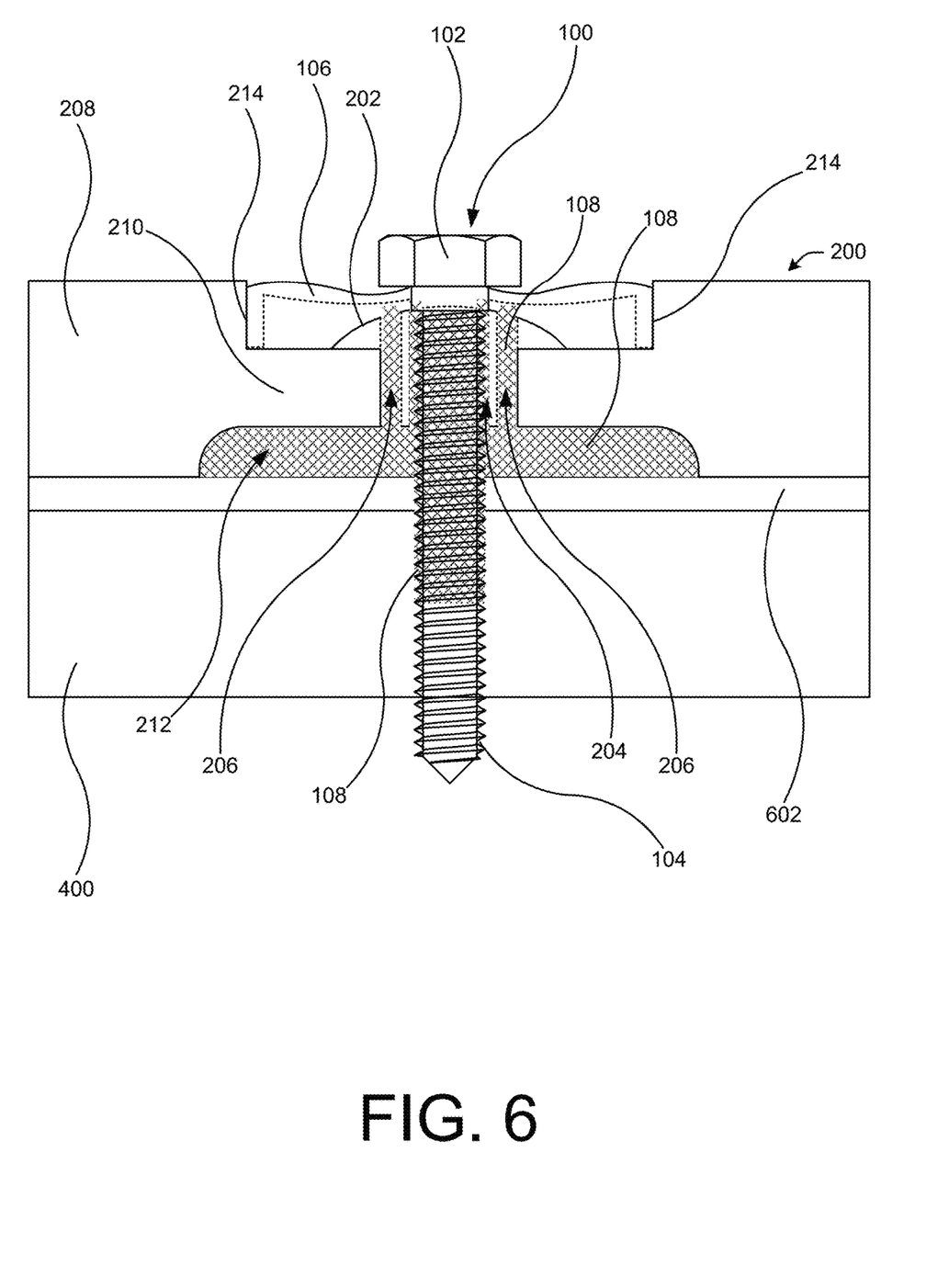
FIG. 6 illustrates a partial cross-sectional side view of the fastener of FIG. 1 engaged with the coupling device of FIG. 2 at a second state and including a flashing layer, according to an example of the principles described herein.

Turning to FIG. 6, FIG. 6 illustrates a partial cross-sectional side view of the fastener 100 of FIG. 1 engaged with the coupling device 200 of FIG. 2 at a second state and including a flashing layer 602, according to an example of the principles described herein. The flashing layer 602 may be disposed between the coupling device 200 and the substrate 400 and may be another layer through which the threaded shaft 104 of the fastener 100 may impinge before entering the substrate 400. The flashing layer 602 may include any layer of impervious material installed to prevent the passage of water into a structure via a borehole created by the fastener 100 as part of a weather resistant barrier system. The flashing layer 602 may cause a structure more durable and reduce indoor mold problems, for example. Flashing materials may include, for example, lead, aluminum, copper, stainless steel, zinc alloy, and other materials.

Figure 7:
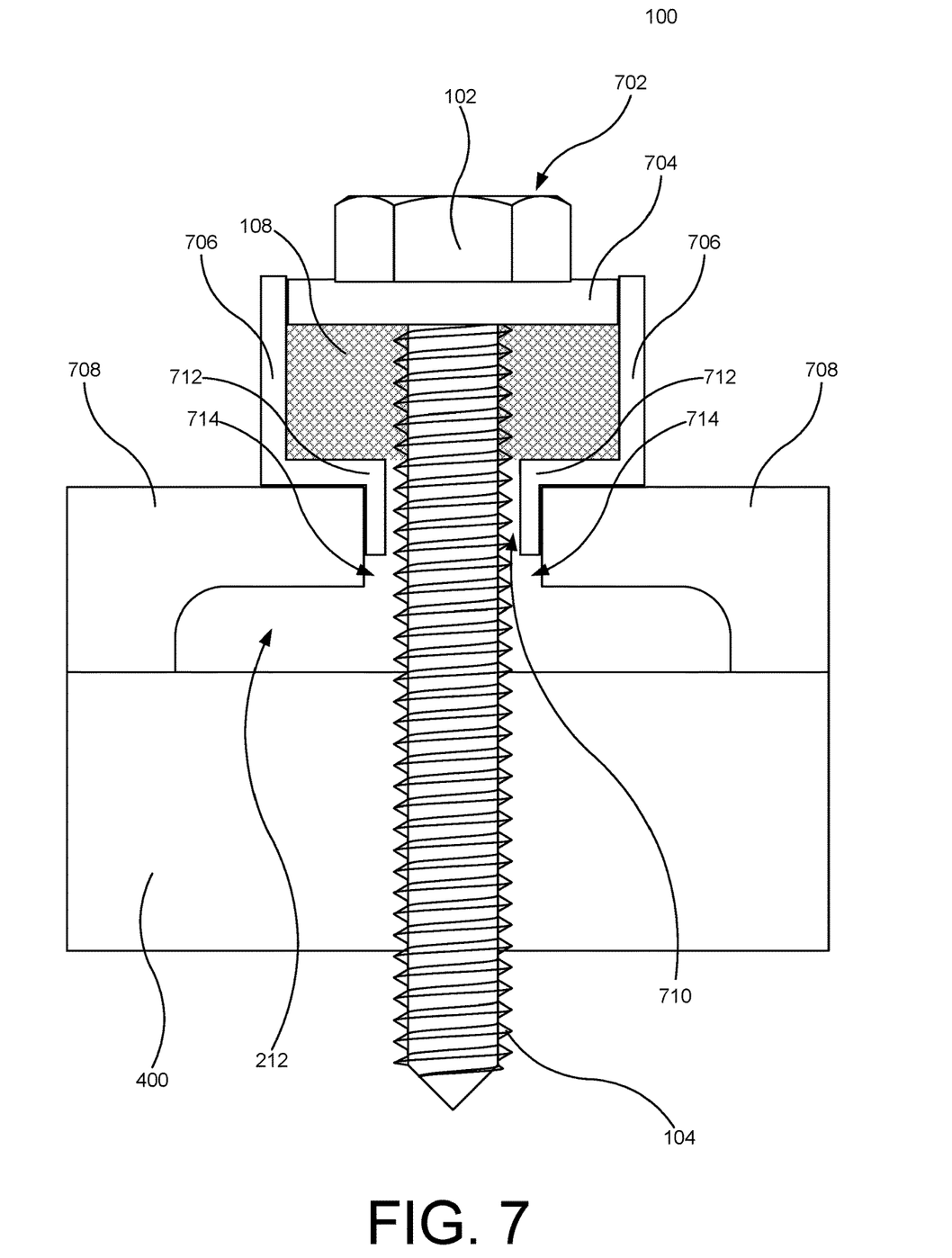
FIG. 7 illustrates a partial cross-sectional side view of a fastener engaged with a coupling device, according to an example of the principles described herein.

FIG. 7 illustrates a partial cross-sectional side view of a fastener 702 engaged with a coupling device 708, according to an example of the principles described herein. The fastener 702 of FIG. 7 may be similar to the fastener 100 of FIGS. 1 through 6 as the fastener 702 includes an amount of sealant 108. The fastener 702 may include a head 102 and a threaded shaft 104. Further, the fastener 702 may include a plunger 704 seated within a reservoir 706. The reservoir 706 may be a non-deformable container that interfaces with the plunger 704. In one example, the plunger 704 interfaces with the reservoir 706 via an engineering fit. In one example, the plunger 704 may be a permanent element that is retained on the fastener 702. In one example, the plunger 704 may be a disposable element that may be removed from the fastener 702 when the plunger 704 has completed its use.

The reservoir 706 may also include a neck 712 that abuts a top side of the coupling device 708 and rests within a coupling aperture 714 defined in the coupling device 708. In this manner, the neck 712 of the reservoir 706 may utilize a number of surfaces of the coupling device 708 to apply a counteracting force in an opposite direction of the force applied by the fastener 702 as the fastener 702 engages with the substrate 400. In one example, the neck 712 of the reservoir 706 may interface the coupling aperture 714 via an engineering fit.

The reservoir 706 may also include a fastener aperture 710 through which the sealant 108 may flow when pressure is exerted by the plunger 704 as the head 102 and the threaded shaft 104 are driven into the substrate 400. Further, the coupling device 708 of FIG. 7 may include a recess 212 into which sealant 108 may be forced.

In operation, the threaded shaft 104 may be interfaced with the substrate 400 via the coupling device 708. As the threaded shaft 104 enters further into the substrate 400, the plunger 704 abuts the head 102 and is forced further down into the reservoir 706. As the plunger is forced further down into the reservoir 706, the sealant 108 is expelled from the reservoir 706, through the fastener aperture 710 and into the recess 212. As the sealant 108 enters the recess 212, and amount of the sealant 108 may also enter the borehole created by the threaded shaft 104 in the substrate 400 in a manner similar to that described above in connection with FIGS. 5 and 6.

In one example, the edges of the reservoir 706 may be coupled to the coupling aperture 714 of the coupling device 708 through gluing, welding, the use of fasteners, or through other means so that the reservoir 706 does not move from its seated position within the coupling aperture 714. In this example, the head 102 and the threaded shaft 104 (e.g., the bolt portion) of the fastener 702 may move independently of the reservoir 706. In one example, the reservoir 706 may be separate from the head 102 and the threaded shaft 104 (e.g., the bolt portion) of the fastener 702 and coupled to the coupling aperture 714 of the coupling device 708 as described above. This combination of the reservoir 706 and the coupling device 708 may be sold and/or packaged as a kit or system apart from the head 102 and the threaded shaft 104 (e.g., the bolt portion), and a user may procure the head 102 and the threaded shaft 104 (e.g., the bolt portion) in order to couple the combination of the reservoir 706 and the coupling device 708 to the substrate 400.

Further, in one example, the fastener 702 and the coupling device 708 may be sold and/or packaged as separate elements or together as a kit or system. In one example, the fastener 702 and the coupling device 708 may be sold and/or packaged in a coupled manner where the reservoir 706 is secured to the coupling device 708 via an engineering fit as described above and with the head 102 and the threaded shaft 104 (e.g., the bolt portion) coupled to the reservoir 706. In one example, the reservoir 706, the head 102 and the threaded shaft 104 (e.g., the bolt portion), and/or the coupling device 708 may all be sold and/or packaged separately or as a kit or system in any combination thereof.

Figure 8:
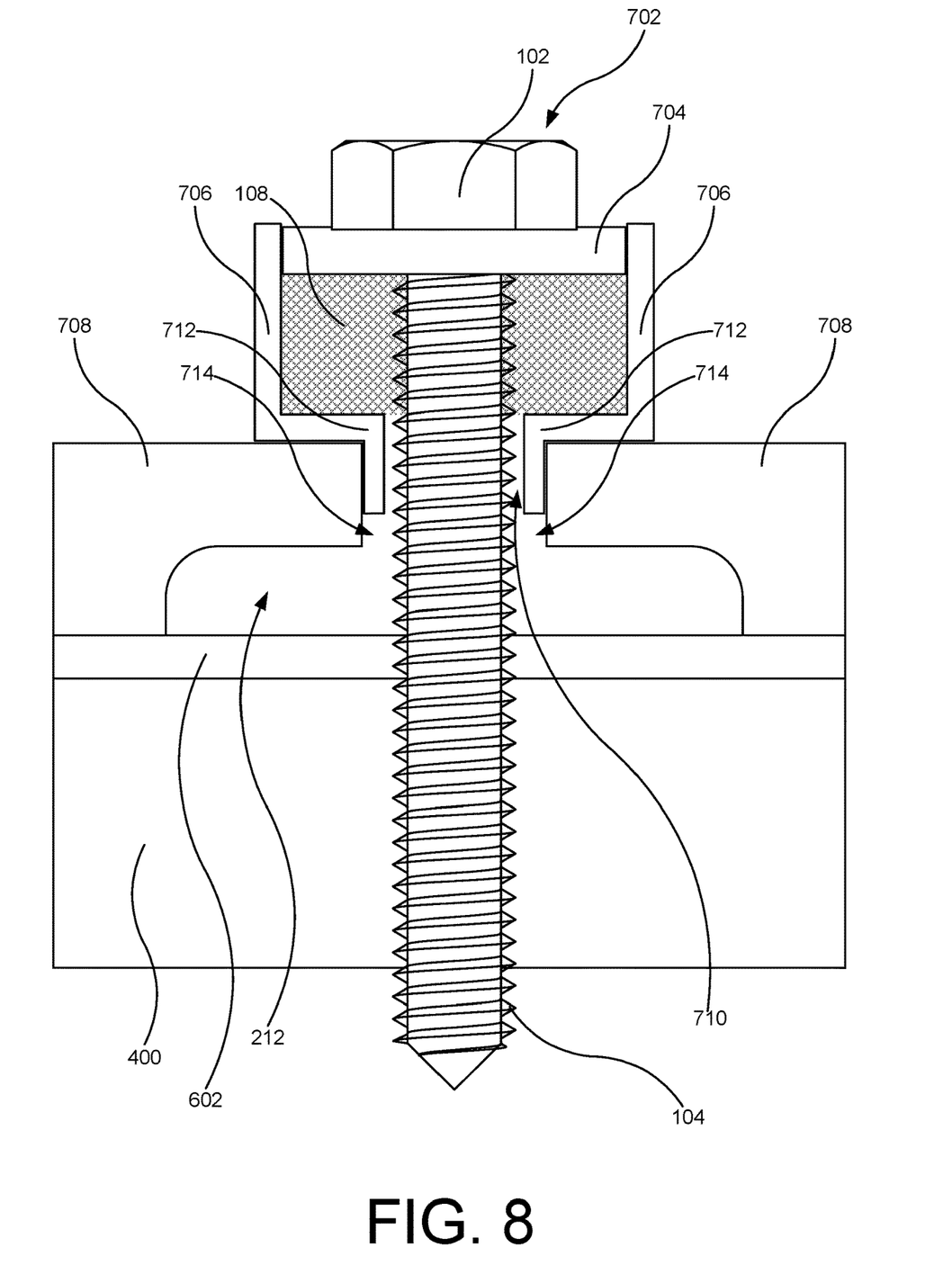
FIG. 8 illustrates a partial cross-sectional side view of the fastener engaged with the coupling device of FIG. 7 and including a flashing layer, according to an example of the principles described herein.

FIG. 8 illustrates a partial cross-sectional side view of the fastener engaged with the coupling device of FIG. 7 and including a flashing layer 602, according to an example of the principles described herein. As similarly described above in connection with FIG. 6, the flashing layer 602, the flashing layer 602 may be disposed between the coupling device 708 and the substrate 400 and may be another layer through which the threaded shaft 104 of the fastener 702 may impinge before entering the substrate 400.

Figure 9:
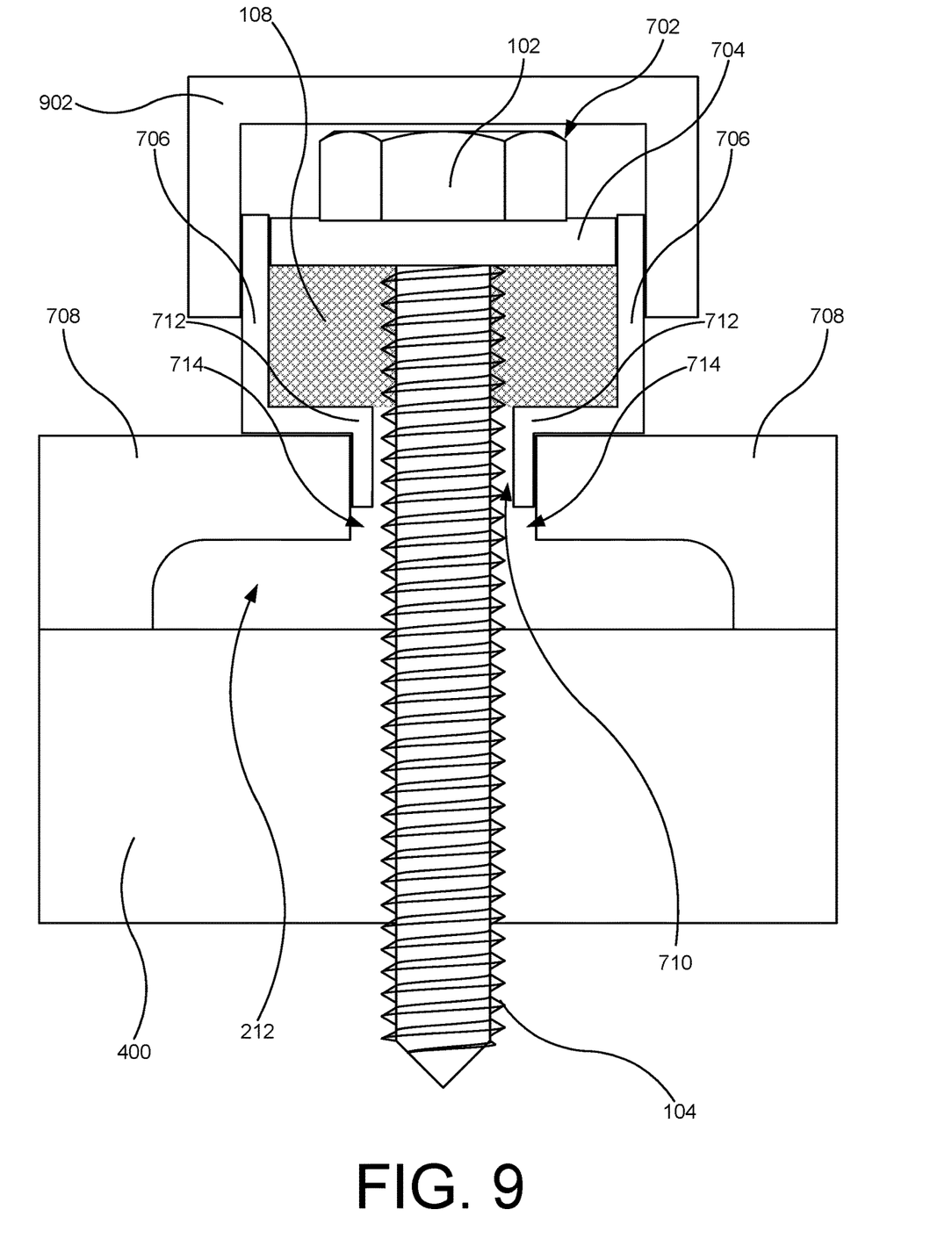
FIG. 9 illustrates a partial cross-sectional side view of the fastener engaged with the coupling device of FIG. 7 and including a cap engaged with the fastener, according to an example of the principles described herein.

FIG. 9 illustrates a partial cross-sectional side view of the fastener 702 engaged with the coupling device 708 of FIG. 7 and including a cap 902 engaged with the fastener 702, according to an example of the principles described herein. In one example, it may be desirable to protect the fastener 702 including the head 102 and the plunger 704 since the head 102 and the plunger 704 may be made of a material that may be compromised by exposure to the environment such as precipitation. Thus, the cap 902 may be coupled to the fastener 702 to cover the head 102 and the plunger 704. In one example, the cap 902 may couple to an outer surface of the reservoir 706 via an engineering fit. In one example, the cap 902 may be coupled to the outer surface of the reservoir 706 gluing, welding, the use of fasteners, or through other means. Further, the application of a cap 902 may be applied to any of the examples described herein.

Figure 10:
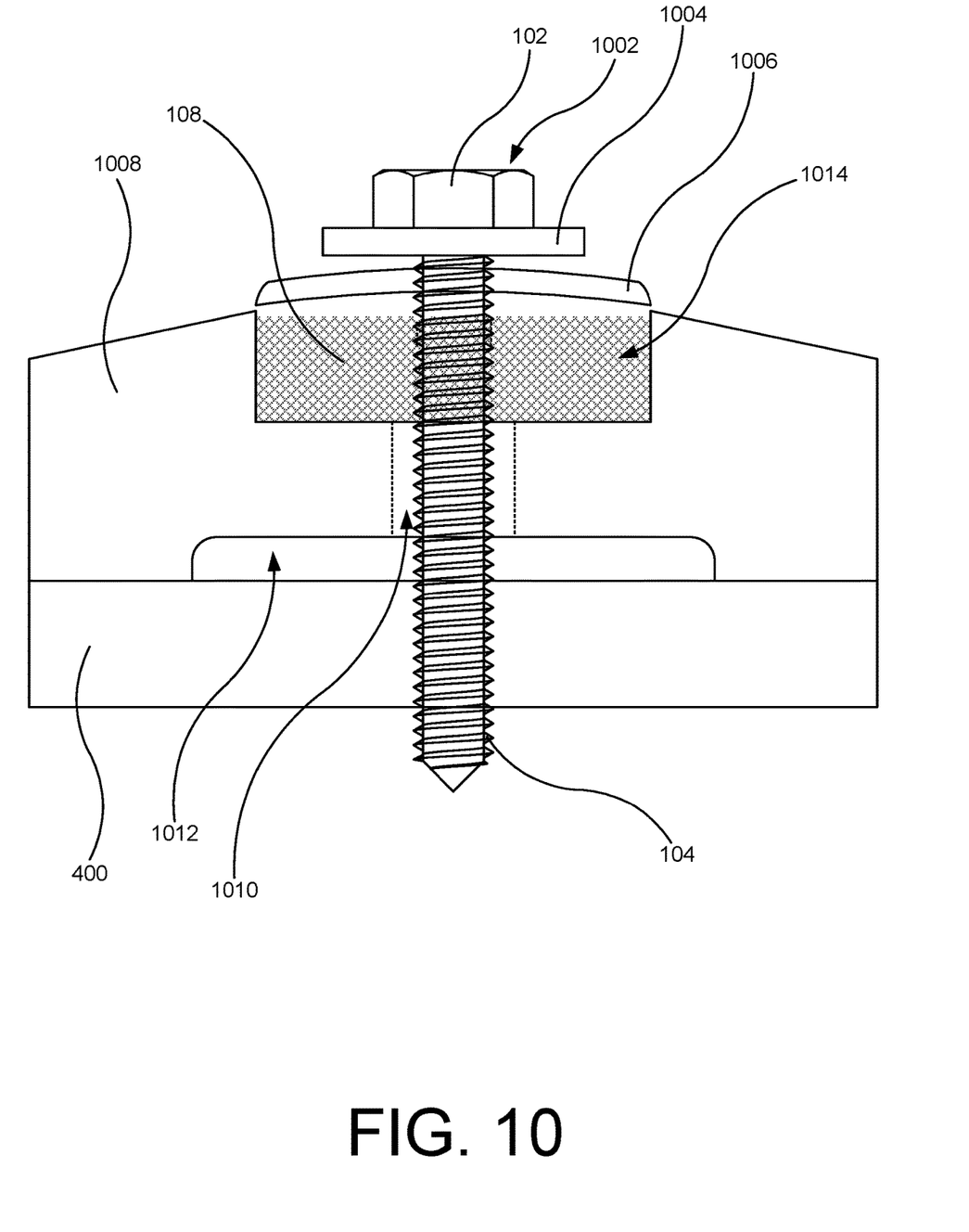
FIG. 10 illustrates a partial cross-sectional side view of a fastener engaged with a coupling device, according to an example of the principles described herein.

FIG. 10 illustrates a partial cross-sectional side view of a fastener 1002 engaged with a coupling device 1008, according to an example of the principles described herein. The fastener 1002 of FIG. 7 may be similar to the fastener 100, 702 of FIGS. 1 through 9 as the fastener 1002 includes an amount of sealant 108. The fastener 1002 may also include a head 102 and a threaded shaft 104. Further, the fastener 1002 may include a washer 1004 and a plunger 1006. In one example, the washer 1004 and/or the plunger 1006 may be rotatably coupled to the threaded shaft 104 such that the washer 1004 and/or the plunger 1006 may rotate freely about the threaded shaft 104 irrespective of the rotation of the threaded shaft 104. In one example, the washer 1004 and/or the plunger 1006 may be fixedly coupled to the threaded shaft 104 such that the washer 1004 and/or the plunger 1006 rotate with the threaded shaft 104 as the threaded shaft 104 rotates. In one example, the plunger 1006 may rotate freely about the threaded shaft 104 and the washer 1004 may be fixedly coupled to the threaded shaft 104 so that the plunger 1006 may remain stationary relative to the sealant 108 rather than spinning with the threaded shaft 104. This may allow for the sealant 108 to appropriately interface with the plunger 1006 as the plunger 1006 forces the sealant 108 out of the reservoir 1014.

The coupling device 1008 may include a reservoir 1014 defined in the top surface of the coupling device 1008. Further, the coupling device may include a fastener aperture 1010 defined within the coupling device 1008 at a location where the threaded shaft 104 is to interface with the coupling device 1008. Still further, a recess 1012 may be defined in a bottom of the coupling device 1008 as similarly described herein in connection with FIGS. 1 through 9. The reservoir 1014 may contain the sealant 108 used to seal the borehole created by the threaded shaft 104. In one example, the sealant may be retained in the reservoir 1014 without running down into a fastener aperture 1010 or the recess 1012 due to the adhesive and/or viscosity properties of the sealant 108 that cause the sealant to remain within the reservoir 1014.

The plunger 1006 of the fastener 1002 may have an arcuate shape to allow for the force of the relatively flatter washer 1004 to be distributed across the width of the reservoir 1014 and place equal amounts of force on the sealant 108 within the reservoir 1014 such that the sealant 108 is better forced into the fastener aperture 1010 during operation. Further, the arcuate shape of the plunger 1006 may cause the sealant 108 that may be otherwise trapped in the corners of the reservoir 1014 to be funneled down the fastener aperture 1010. The plunger 1006 may interface with the reservoir 1014 via an engineering fit such that the plunger 1006 may effectively keep the sealant 108 within the reservoir 1014 and not allow any sealant 108 to leak out of the reservoir 1014 and past the ends of the plunger 1006 as the plunger 1006 forces the sealant 108 out of the reservoir 1014.

In operation, the threaded shaft 104 may be interfaced with the substrate 400 via the coupling device 1008. As the threaded shaft 104 enters further into the substrate 400, the head 102 comes into contact with the washer 1004 and applies force to the washer 1004. In turn, the washer 1004 comes into contact with the plunger 1006. As the plunger 1006 is force downward toward the fastener aperture 1010, the sealant 108 is expelled from the reservoir 1014 through the fastener aperture 1010 and into the recess 1012. As the sealant 108 enters the recess 1012, and amount of the sealant 108 may also enter the borehole created by the threaded shaft 104 in the substrate 400 in a manner similar to that described above in connection with FIGS. 5 through 9.

In one example, the fastener 1002 and the coupling device 1008 may be sold and/or packaged as separate elements or together as a kit or system. In one example, the fastener 1002 and the coupling device 1008 may be sold and/or packaged in a coupled manner where the head 102 and the threaded shaft 104 (e.g., the bolt portion) are coupled to the reservoir 1014 of the coupling device 1008 via an engineering fit as described above. In one example, the washer 1004, the plunger 1006, the head 102 and the threaded shaft 104 (e.g., the bolt portion), and/or the coupling device 1008 may all be sold and/or packaged separately or as a kit or system in any combination thereof.

Figure 11:
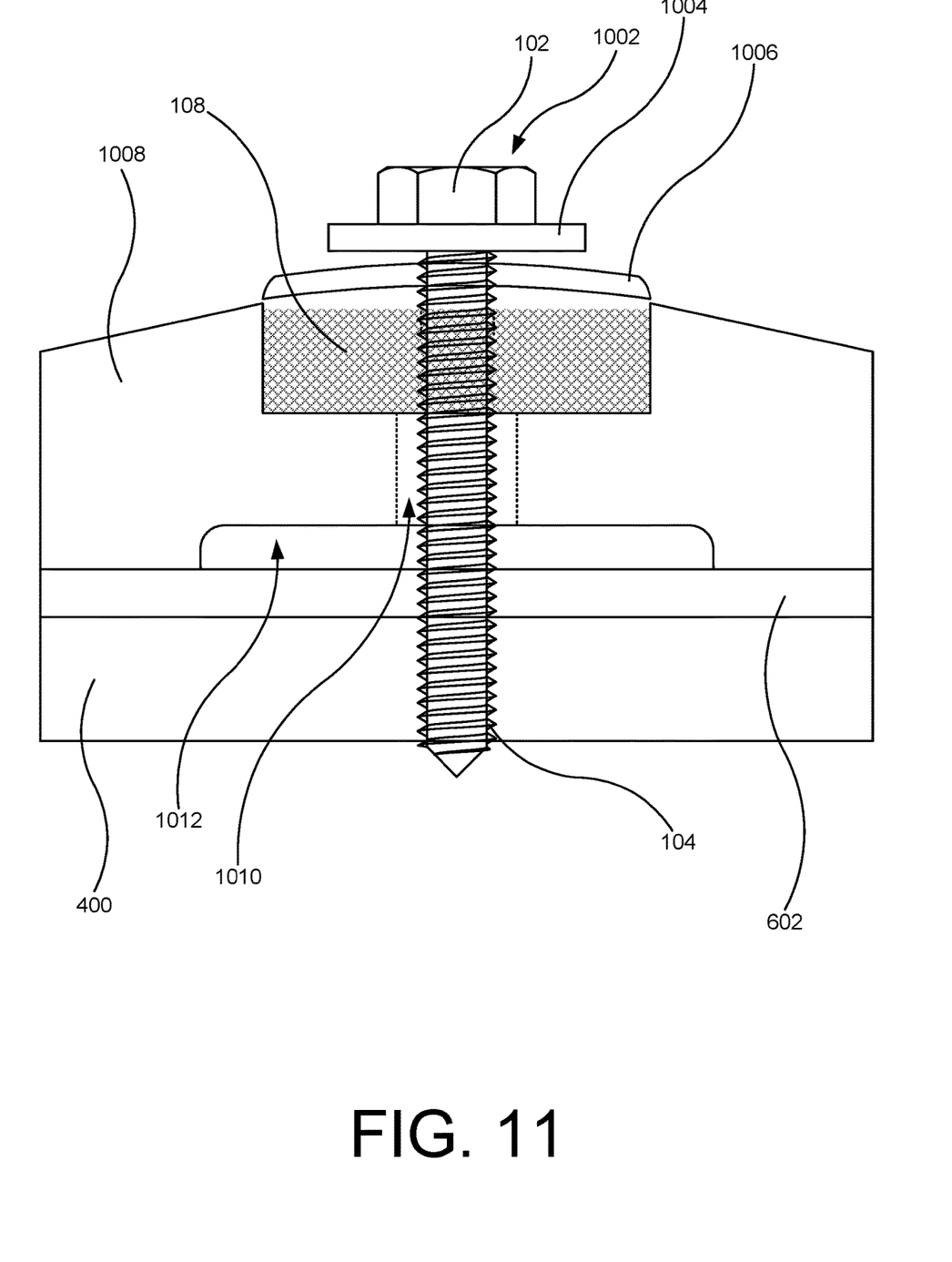
FIG. 11 illustrates a partial cross-sectional side view of the fastener engaged with the coupling device of FIG. 10 and including a flashing layer, according to an example of the principles described herein.

FIG. 11 illustrates a partial cross-sectional side view of the fastener 1002 engaged with the coupling device 1008 of FIG. 10 and including a flashing layer 602, according to an example of the principles described herein. As similarly described above in connection with FIGS. 6 and 8, the flashing layer 602, the flashing layer 602 may be disposed between the coupling device 1008 and the substrate 400 and may be another layer through which the threaded shaft 104 of the fastener 1002 may impinge before entering the substrate 400.

Figure 12:
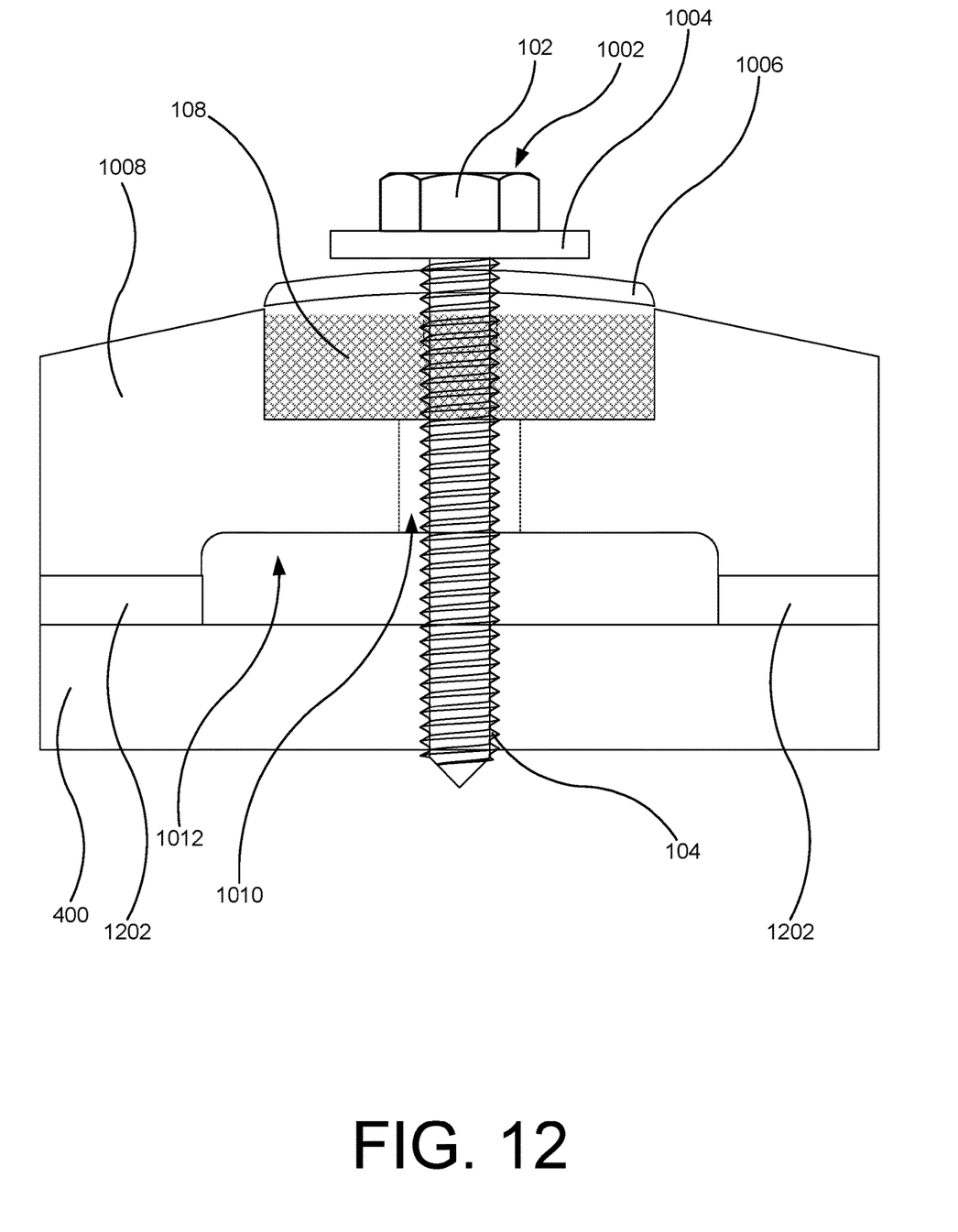
FIG. 12 illustrates a partial cross-sectional side view of the fastener engaged with the coupling device of FIG. 10 and including a minimized flashing layer, according to an example of the principles described herein.

FIG. 12 illustrates a partial cross-sectional side view of the fastener 1002 engaged with the coupling device 1008 of FIG. 10 and including a minimized flashing layer 1202, according to an example of the principles described herein. Unlike the flashing layers 602 described above, the flashing layer 1202 of FIG. 12 may be located between the coupling device 1008 and the substrate 400 at points where the recess 1012 is not located. For example, as depicted in FIG. 12, the minimized flashing layer 1202 does not exist within the recess 1012 but, instead, is located at the feet of the coupling device 1008 created beyond the dimensions of the recess 1012. In this manner, the minimized flashing layer 1202 may be included in the invention to provide additional weatherproofing and sealing from the environment while having the threaded shaft 104 not have to create a borehole in the flashing layer 602 as depicted in FIGS. 6, 8, and 11. Not having to create a borehole in the flashing layer 602 creates a situation where the sealant 108 is not required to enter the borehole in the flashing layer 602 and further penetrate into the borehole created by the threaded shaft 104 in the substrate 400. Further, the application of the minimized flashing layer 1202 may be applied to any of the examples described herein.

Conclusion

The examples described herein provide a system and method of creating a water-tight seal around the fastener resulting in the inability of water entering underneath the coupling device, within the coupling device, around the fastener and/or within the structure.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A coupling system for attaching an object to a substrate, the coupling system comprising:
    a fastening device including:
        a fastener, and
        a sealant, the sealant being disposed about the fastener;
    a reservoir in which the sealant is contained; and
    a coupling device including:
        at least one aperture defined in the coupling device, and at least one recess defined in a first side of the coupling device and located opposite a second side of the coupling device including the reservoir, the at least one recess being in fluid communication with the reservoir and the at least one aperture, wherein engagement of the fastener with the substrate via the coupling device forces the sealant from the reservoir, through the at least one aperture, and into the recess.

2. The coupling system of claim 1, wherein the engagement of the fastener with the coupling device further forces the sealant into a borehole defined within the substrate by the fastener as the fastener engages with the substrate.

3. The coupling system of claim 1, further comprising a flashing, wherein the fastener engages with the substrate via the flashing.

4. The coupling system of claim 3, wherein the engagement of the fastener with the coupling device further forces the sealant into a borehole defined within the flashing as the fastener engages with the flashing.

5. The coupling system of claim 1, further comprising:
a deformable substrate enclosing the sealant, the deformable substrate forming at least a portion of the reservoir,
wherein deformation of the deformable substrate by the fastener engaging with the substrate forces the sealant from the reservoir, through the at least one aperture, and into the recess.

6. The coupling system of claim 1, further comprising:
a plunger coupled to the fastener, and
at least one buttress wall opposing the plunger, forming at least a portion of the reservoir with the plunger,
wherein the plunger forces the sealant into the at least one aperture and the recess when the fastener is engaged with the substrate.

7. The coupling system of claim 6, wherein the at least one buttress wall is formed on the coupling device.

8. The coupling system of claim 6, wherein the plunger is a permanent device or disposable.

9. The coupling system of claim 1, wherein:
the coupling device includes a plurality of apertures defined therethrough, and
the engagement of the fastener with the substrate via the coupling device forces the sealant from the reservoir, through the plurality of apertures, and into the recess.

10. The coupling system of claim 1, wherein the coupling device couples the object to the substrate by the object coupling to the coupling device.

11. The coupling system of claim 1, further comprising a cap removably disposed over the fastener.

12. A fastening device, comprising:
a fastener, and
a sealant, the sealant being disposed about the fastener,
wherein engagement of the fastener with a substrate forces the sealant into at least a borehole defined within the substrate as the fastener engages with the substrate.

13. The fastening device of claim 12, further comprising a flashing, wherein:
the fastener engages with the substrate via the flashing, and
the engagement of the fastener forces the sealant into a borehole defined within the flashing as the fastener engages with the flashing.

14. The fastening device of claim 12, further comprising:
a deformable substrate enclosing the sealant,
wherein deformation of the deformable substrate by the fastener engaging with the substrate forces the sealant from the deformable substrate and into the borehole defined within the substrate as the fastener engages with the substrate.

15. The fastening device of claim 12, further comprising:
a plunger coupled to the fastener, and
at least one buttress wall, the at least one buttress wall opposing the plunger, the buttress wall and the plunger forming at least a portion of a reservoir, the reservoir containing the sealant,
wherein the plunger forces the sealant into the borehole defined within the substrate as the fastener engages with the substrate.

16. The fastening device of claim 12, further comprising a cap removably disposed over the fastener.

17. A coupling device comprising:
a reservoir in which a sealant is contained, the reservoir including at least one buttress wall;
at least one aperture defined in the coupling device; and
at least one recess defined in a first side of the coupling device and located opposite a second side of the coupling device including the reservoir, the at least one recess being in fluid communication with the reservoir and the at least one aperture,
wherein engagement of a fastener with a substrate via the coupling device forces the sealant from the reservoir with the at least one buttress wall exhibiting force on the sealant, first through the at least one aperture, and then into the recess.

18. The coupling device of claim 17, wherein:
the coupling device includes a plurality of apertures defined therethrough, and
the engagement of the fastener with the substrate via the coupling device forces the sealant from the reservoir, through the plurality of apertures, and into the recess.

19. The coupling device of claim 17, wherein the coupling device couples an object to the substrate.

20. The coupling device of claim 17, further comprising flashing located juxtaposition to the recess.

* * * * *